US012222100B2

(12) United States Patent
Sung

(10) Patent No.: US 12,222,100 B2
(45) Date of Patent: Feb. 11, 2025

(54) DAYLIGHT LED LIGHT, DAYLIGHT LED LIGHT APPARATUS, AND DAYLIGHT LED FLOODLIGHT APPARATUS

(71) Applicant: Solar Mission Co., Ltd., Suwon-si (KR)

(72) Inventor: Gi Suk Sung, Seongnam-si (KR)

(73) Assignee: SOLAR MISSION CO., LTD. (KR)

( * ) Notice: Subject to any disclaimer, the term of this patent is extended or adjusted under 35 U.S.C. 154(b) by 0 days.

(21) Appl. No.: 18/273,954

(22) PCT Filed: May 10, 2022

(86) PCT No.: PCT/KR2022/006681
§ 371 (c)(1),
(2) Date: Jul. 24, 2023

(87) PCT Pub. No.: WO2022/240152
PCT Pub. Date: Nov. 17, 2022

(65) Prior Publication Data

US 2024/0410549 A1 Dec. 12, 2024

(30) Foreign Application Priority Data

May 11, 2021 (KR) ........................ 10-2021-0060509
Jun. 30, 2021 (KR) ........................ 10-2021-0085572

(51) Int. Cl.
*F21K 9/232* (2016.01)
*F21K 9/238* (2016.01)
(Continued)

(52) U.S. Cl.
CPC ................ *F21V 9/02* (2013.01); *F21K 9/232* (2016.08); *F21K 9/238* (2016.08); *F21K 9/64* (2016.08);
(Continued)

(58) Field of Classification Search
CPC ... F21K 9/64; F21K 9/00; F21K 9/232; F21K 9/238; F21Y 2113/10; F21Y 115/10
See application file for complete search history.

(56) References Cited

U.S. PATENT DOCUMENTS 7,810,947 B2 * 10/2010 Ueno .................. C09K 11/584
362/231
10,147,850 B1 * 12/2018 Krames ............... H01L 25/0753
(Continued)

FOREIGN PATENT DOCUMENTS

JP 2017507491 A 3/2017
KR 20110101789 A 9/2011
(Continued)

OTHER PUBLICATIONS

International Search Report for PCT/KR2022/006681, mailed Aug. 19, 2022.

*Primary Examiner* — William J Carter
(74) *Attorney, Agent, or Firm* — Renaissance IP Law Group LLP

(57) ABSTRACT

A daylight LED light, a daylight LED light apparatus, and a daylight LED floodlight apparatus are provided. A daylight LED light according to an embodiment of the present inventive concept comprises: a plurality of first LED light sources having a color temperature of 5000 to 6500 K when emitting light, by applying RGB phosphors on purple light-emitting LED chips; a plurality of second LED light sources having a color temperature of 2500 to 3000 K when emitting light, by applying RGB phosphors on purple light-emitting chips; and a plurality of third LED light sources formed from red light-emitting LED chips. The number of first LED light sources is greater than the number of third LED light sources, and the number of third LED light sources is greater than the number of second LED light sources.

14 Claims, 7 Drawing Sheets

(51) Int. Cl.

| | |
|---|---|
| ***F21K 9/64*** | (2016.01) |
| ***F21V 9/02*** | (2018.01) |
| ***F21V 15/01*** | (2006.01) |
| ***F21V 29/503*** | (2015.01) |
| ***F21V 29/76*** | (2015.01) |
| ***F21Y 115/10*** | (2016.01) |
| *F21Y 105/16* | (2016.01) |
| *F21Y 105/18* | (2016.01) |
| *F21Y 113/13* | (2016.01) |
| *H05B 45/37* | (2020.01) |

(52) U.S. Cl.

CPC ............ *F21V 15/01* (2013.01); *F21V 29/503* (2015.01); *F21V 29/763* (2015.01); *F21Y 2105/16* (2016.08); *F21Y 2105/18* (2016.08); *F21Y 2113/13* (2016.08); *F21Y 2115/10* (2016.08); *H05B 45/37* (2020.01)

(56) References Cited

U.S. PATENT DOCUMENTS

| | | | | |
|---|---|---|---|---|
| 2014/0055982 | A1* | 2/2014 | Tao | C09K 11/77348<br>362/231 |
| 2016/0290573 | A1* | 10/2016 | Allen | H05B 45/20 |

FOREIGN PATENT DOCUMENTS

| | | | |
|---|---|---|---|
| KR | 20110102631 | A | 9/2011 |
| KR | 101268369 | B1 | 5/2013 |
| KR | 20150051780 | A | 5/2015 |
| KR | 20210028167 | A | 3/2021 |
| KR | 20210045356 | A | 4/2021 |

* cited by examiner

DAYLIGHT LED LIGHT, DAYLIGHT LED LIGHT APPARATUS, AND DAYLIGHT LED FLOODLIGHT APPARATUS

TECHNICAL FIELD

The present inventive concept relates to a daylight LED light, a daylight LED light apparatus, and a daylight LED floodlight apparatus, more specifically to a daylight LED light, a daylight LED light apparatus, and a daylight LED floodlight apparatus that are capable of emitting light with spectrum similar to daylight using a plurality of LED chips.

BACKGROUND ART

A light emitting diode (LED) light source has many advantages, such as low consumption power, high durability, and a high degree of freedom in design a variety of lights, so that the LED light source has been drastically developed.

After LED chips of three primary colors (RGB) have been initially invented, studies of a light source using the LED chips are actively made, and RGB LEDs are thus combined to obtain white light having high efficiency. Further, phosphors are applied to primary color LEDs or short-wavelength LEDs to develop light for an incandescent light bulb. The white light using the LED chips is advantageous in the efficiency of brightness, whereas the light for the incandescent light bulb is advantageous in human body health, so that they are appropriately combined and used. However, it is known that the most advantageous light for the human body is daylight (sunlight), and accordingly, the light closest to the daylight is needed in an environment where a person spends a lot of time indoors or in a basement in which daylight is not enough. To increase daylight in a space such as the basement in which daylight is not enough, external daylight is introduced into indoor space through a reflection mirror, a pipe, and the like. In this case, a high installation cost is caused, but the efficiency of increasing daylight is not good.

A conventional LED light has blue LEDs and yellow phosphors and, red LEDs to obtain natural light. In this case, the red LEDs have peak wavelengths, and thus, the number of red LEDs is increased, thereby undesirably reducing the brightness efficiency of the LED light. Further, cyan LEDs are added to reduce the number of red LEDs, but in this case, if the number of red LEDS is reduced, it is hard to obtain natural light.

For example, two blue LEDs and yellow phosphors, one red LED, and four cyan LEDs constitute one LED module, and in this case, each LED module has a PCB substrate and four lead frames. Accordingly, if a surface light source is provided using the LED modules, the surface light source is complicated in structure and requires high power consumption because of the number of PCB substrates corresponding to the number of LED modules and the number of lead frames needed correspondingly to the PCB substrates. If a bulb type light is provided using the LED modules, further, the bulb type light is bulky because of a large number of LED modules.

Furthermore, the conventional LED light does not have any color rendering index (CRI) close to a CRI of 100 of daylight.

Accordingly, there is a need to develop an LED light capable of emitting light having the spectrum similar to the daylight using LED chips, while having a configuration in which the red LED light sources with peak wavelengths are included to a minimum. If the LED light is applied to a surface light source, in this case, it has to be simple in configuration and have low power consumption, and further, if the LED light is applied to a bulb type LED light, it has to have a small size in a single structure.

Unlike a flat plate type LED light, further, an LED floodlight is used as a high efficiency LED light that has no diffusion plate on the front surfaces of the LED modules. In this case, if the above-mentioned LED light is used for the floodlight with no diffusion plate on the front surface thereof, the spectrum and CRI of the light emitted therefrom are distant from sunlight.

Accordingly, there is a need to develop an LED floodlight with no diffusion plate disposed on the front surface thereof that is capable of having the light with the spectrum similar to daylight and obtaining a CRI of 99 closest to the CRI of 99.5 of daylight.

DISCLOSURE OF INVENTION

Technical Problems

Accordingly, the present inventive concept has been made in view of the above-mentioned problems occurring in the related art, and it is an object of the present inventive concept to provide a daylight LED light and a daylight LED light apparatus that are capable of emitting light with the spectrum similar to daylight using LED chips, while having a configuration in which red LED light sources with peak wavelengths are included to a minimum, wherein if the daylight LED light is applied to a surface light source, it is simple in configuration and has low power consumption, and if the daylight LED light is applied to a bulb type light, it has a small size because of a single structure.

It is another object of the present inventive concept to provide a daylight LED floodlight apparatus with no diffusion plate disposed on the front surface thereof that is capable of emitting light with the spectrum similar to daylight and obtaining a CRI of 99 closest to the CRI of 99.5 of daylight.

Technical Solutions

To accomplish the above-mentioned objects, according to one aspect of the present inventive concept, a daylight LED light may include: a plurality of first LED light sources having a color temperature of 5000 to 6500 K when emitting light, by applying RGB phosphors onto purple light-emitting LED chips; a plurality of second LED light sources having a color temperature of 2500 to 3000 K when emitting light, by applying RGB phosphors onto purple light-emitting LED chips; and a plurality of third LED light sources having red light-emitting LED chips, wherein the number of first LED light sources may be greater than the number of third LED light sources, and the number of third LED light sources may be greater than the number of second LED light sources.

According to the present inventive concept, the daylight LED light may further include rectangular plate-shaped PCB substrates. In this case, the first LED light sources, the second LED light sources, and the third LED light sources may be arranged in rows and columns with given intervals on the PCB substrates to provide light sources for a surface light source or fluorescent light.

According to the present inventive concept, the daylight LED light may further include a circular plate-shaped PCB substrate. In this case, the first LED light sources, the second LED light sources, and the third LED light sources may be arranged radially on the PCB substrate to provide light sources for a bulb.

According to the present inventive concept, the color temperature of each first LED light source may be 6500 K, the color temperature of each second LED light source may be 2700 K, and the wavelength of each third LED light source may be in the range of 660 to 780 nm.

According to the present inventive concept, if the total LED light sources have the same power, the percentage of the first LED light sources with respect to the total LED light sources may be in the range of 50 to 90%, the percentage of the second LED light sources with respect to the total LED light sources may be in the range of 0 to 10%, and the percentage of the third LED light sources with respect to the total LED light sources may be in the range of 10 to 40%.

According to the present inventive concept, the ratio of the first LED light sources to the second LED light sources to the third LED light sources may be 6:1:3.

To accomplish the above-mentioned objects, according to another aspect of the present inventive concept, a daylight LED light apparatus may include: the daylight LED light having the PCB substrates adapted to mount the first LED light sources, the second LED light sources, and the third LED light sources thereon according to claim 1; a converter for converting alternating current received into direct current for driving the LED light sources of the daylight LED light; a housing for accommodating the LED light sources and the converter therein; and a transparent or semi-transparent diffusion cover disposed on one side of the housing to face the LED light sources.

According to the present inventive concept, the housing may be a case having a bottom and wall bodies formed along the edges of the bottom, the diffusion cover may be disposed to face the bottom in such a way as to be coupled to the end portions of the wall bodies, and the PCB substrates may have the shapes of rectangular plates and be located on the bottom, so that if the number of PCB substrate is one, the LED light sources may become fluorescent type light sources, and if a plurality of PCB substrates are arranged at given intervals, the LED light sources may become surface light sources.

According to the present inventive concept, the housing may include a cylindrical bulb body for emitting the heat generated to the outside and a socket located on the underside of the bulb body to supply power to the inside of the bulb body, the diffusion cover may be disposed to face the PCB substrate in such a way as to be coupled to top of the bulb body, and the PCB substrate may have the shape of a circular plate and be located at the inside of the bulb body, so that the LED light sources may become bulb type light sources.

To accomplish the above-mentioned objects, according to yet another aspect of the present inventive concept, a daylight LED floodlight apparatus may include: a plurality of first LED light sources having a color temperature of 5500 to 5700 K when emitting light, by applying RGB phosphors onto violet light-emitting LED chips; at least one or more second LED light sources as red light-emitting LEDs having a peak wavelength of 630 to 720 nm; and at least one or more third LED light sources as red light-emitting LEDs having a peak wavelength of 730 to 780 nm, wherein the number of first LED light sources may be greater than the number of LED light sources made by adding the number of second LED light sources and the number of third LED light sources.

According to the present inventive concept, the number of third LED light sources may be greater than the number of second LED light sources.

According to the present inventive concept, if the total LED light sources have the same power, the output percentage of the first LED light sources with respect to the total LED light sources may be in the range of 65 to 92%, the output percentage of the second LED light sources with respect to the total LED light sources may be in the range of 3 to 15%, and the output percentage of the third LED light sources with respect to the total LED light sources may be in the range of 5 to 20%.

According to the present inventive concept, the installation area percentage of the first LED light sources with respect to the installation area of the total LED light sources may be in the range of 80 to 90%, the installation area percentage of the second LED light sources with respect to the installation area of the total LED light sources may be in the range of 4 to 8%, and the installation area percentage of the third LED light sources with respect to the installation area of the total LED light sources may be in the range of 6 to 12%.

According inventive concept, the daylight LED floodlight apparatus may further include: a stand for supporting PCT substrates on which the first LED light sources, the second LED light sources, and the third LED light sources are mounted against one surface thereof; a heat transfer member located on the other surface of the stand to transfer the heat generated from the first LED light sources, the second LED light sources, and the third LED light sources to the outside; a heat radiation member coming into close contact with the heat transfer member to radiate the heat received from the heat transfer member to the outside; a converter for converting alternating current received into direct current for driving the first LED light sources, the second LED light sources, and the third LED light sources; and a housing for accommodating the stand and the converter, while exposing the front surfaces of the first LED light sources, the second LED light sources, and the third LED light sources to the outside, and having a plurality of holes through which the radiation heat of the heat radiation member is exhausted to the outside, the holes being formed to face the heat radiation member.

Advantageous Effectiveness

According to the present inventive concept, the daylight LED light can emit the light with the spectrum similar to the daylight using the LED chips, while having a configuration in which the red LED light sources with the peak wavelengths are included to a minimum, and if the daylight LED light is applied to the surface light source and the LED fluorescent type light, it is simple in configuration and has low power consumption. Further, the daylight LED light is applied to the bulb type daylight LED light, it has a small size because of a single structure.

According to the present inventive concept, further, the daylight LED floodlight apparatus with no diffusion plate disposed on the front surface thereof emits the light with the spectrum similar to daylight and achieves a CRI of 99 closest to the CRI of 99.5 of daylight.

MODE FOR INVENTION

Figure 1:
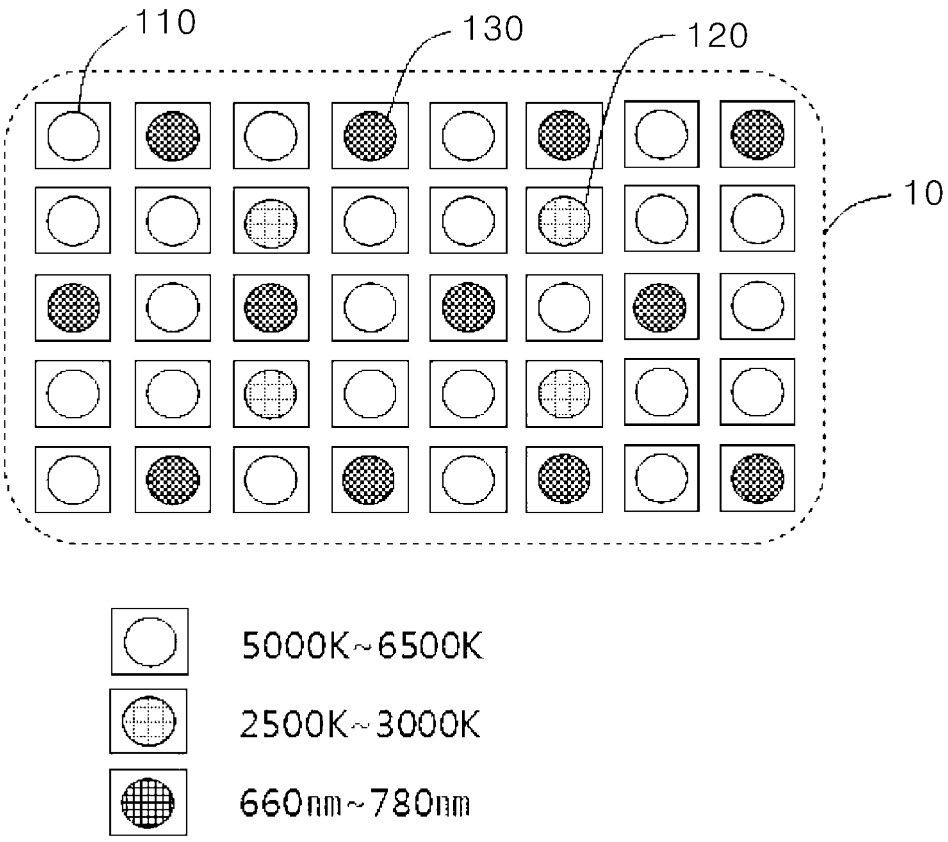
FIG. 1 is a schematic view showing a daylight LED light according to a first embodiment of the present inventive concept.

Hereinafter, an embodiment of the present inventive concept will be explained in detail so that it may be carried out easily by those having ordinary skill in the art. Before the present inventive concept is disclosed and described, it is to be understood that the disclosed embodiments are merely exemplary of the invention, which can be embodied in various forms. In the drawings, parts having no relation with the explanation are omitted, and in the description, it should be noted that the parts corresponding to those of the drawings are indicated by corresponding reference numerals.

Hereinafter, an explanation of a daylight LED light according to a first embodiment of the present inventive concept will be given in detail with reference to the attached drawings.

FIG. 1 is a schematic view showing a daylight LED light according to a first embodiment of the present inventive concept.

As shown in FIG. 1, a daylight LED light 10 according to a first embodiment of the present inventive concept includes first LED light sources 110, second LED light sources 120, and third LED light sources 130.

The first LED light sources 110 each have a color temperature (Kelvin scale) of 5000 to 6500 K when emitting light. The first LED light sources 110 are configured to apply RGB phosphors onto purple light-emitting LED chips to thus have the color temperature of 5000 to 6500 K. In specific, the first LED light sources 110 are configured to apply a red (R) phosphor, a green (G) phosphor, and a blue (B) phosphor to purple light-emitting LED chips so that when the purple light-emitting LED chips emit light, they each have the color temperature of 5000 to 6500 K, desirably the color temperature of 6500 K to thus emit light having a white tone to which a light blue color is added to represent a state of the sky on a sunny day.

The second LED light sources 120 each have a color temperature of 2500 to 3000 K when emitting light. The second LED light sources 120 are configured to apply RGB phosphors onto purple light-emitting LED chips to thus have the color temperature of 2500 to 3000 K. In specific, the second LED light sources 120 are configured to apply a red (R) phosphor, a green (G) phosphor, and a blue (B) phosphor to purple light-emitting LED chips so that when the purple light-emitting LED chips emit light, they each have the color temperature of 2500 to 3000 K, desirably the color temperature of 2700 K to thus emit light having a warm white tone to which a light red color is added to represent a state of the sky when the sun rises or goes down.

The third LED light sources 130 are LED light sources having red light-emitting LED chips. The third LED light sources 130 emit red light with the peak wavelength of 660 to 780 nm. However, the third LED light sources 130 may be formed of LED light sources from which near infrared light is emitted, without being limited thereto. It is important that since the spectrum of the sun shows peak values at the wavelengths of 670 nm, 700 nm, 750 nm, and 780 nm on the red color and the near infrared light, the peak value LEDs are arranged in the same manner as the sun.

In this case, the number of first LED light sources 110 is greater than the number of third LED light sources 130, and the number of third LED light sources 130 is greater than the number of second LED light sources 120. For example, if the total LED light sources have the same power, the percentage of the first LED light sources 110 with respect to the total LED light sources is in the range of 50 to 80%, the percentage of the second LED light sources 120 with respect to the total LED light sources is in the range of 5 to 10%, and the percentage of the third LED light sources 130 with respect to the total LED light sources is in the range of 15 to 40%.

In more specific, the first LED light sources 110 serve to keep the efficiency as a bright light. The number of first LED light sources 110 is set to correspond to 50 to 80% of the total number of LED light sources of the daylight LED light 10 according to the first embodiment of the present inventive concept if the total LED light sources have the same power.

The second LED light sources 120 lower the color temperature of the day white or cool white of the first LED light sources 110 to the color temperature of warm white, but they serve to delay the arrival to daylight. The number of second LED light sources 120 is set to correspond to 5 to 10% of the total number of LED light sources of the daylight LED light 10 according to the first embodiment of the present inventive concept.

The third LED light sources 130 serve to add the red light to the light delayed to daylight through the first LED light sources 110 and the second LED light sources 120 to thus emit light with the spectrum similar to daylight. The number of third LED light sources 130 is set to correspond to 15 to 40% of the total number of LED light sources of the daylight LED light 10 according to the first embodiment of the present inventive concept.

For another example, if the total LED light sources have the same power, the percentage of the first LED light sources 110 with respect to the total LED light sources of the daylight LED light 10 according to the first embodiment of the present inventive concept is in the range of 50 to 90%, the percentage of the second LED light sources 120 with respect to the total LED light sources is in the range of 0 to 10%, and the percentage of the third LED light sources 130 with respect to the total LED light sources is in the range of 10 to 40%.

If it is assumed that an output of the daylight LED light 10 according to the first embodiment of the present inventive concept is 40 W and an LED light source of an output of 1 W is used, as shown in FIG. 1, the number of first LED light sources 110 each having the color temperature of 6500 K is 24 (60%), the number of second LED light sources 120 each having the color temperature of 2700 K is 4 (10%), and the number of third LED light sources 130 each having the peak wavelengths of 660 to 780 nm is 12 (30%), so that they are arranged to provide the daylight LED light having the spectrum similar to the spectrum of the sun. That is, the ratio of the first LED light sources 110 to the second LED light sources 120 to the third LED light sources 130 is 6:1:3.

Figure 2:
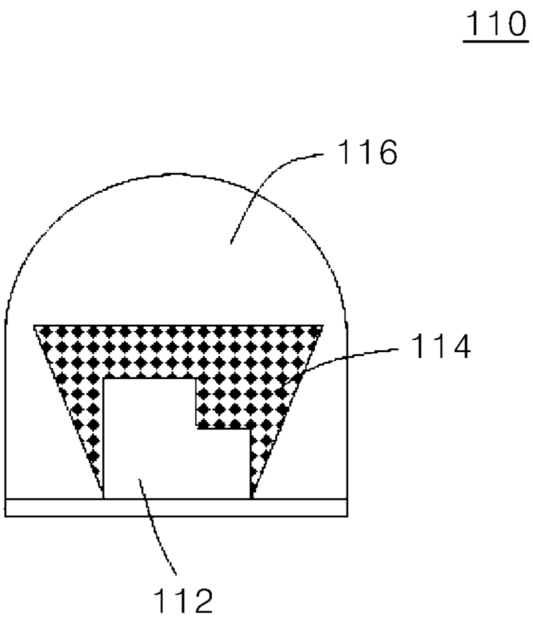
FIG. 2 is a schematic view showing a configuration of an LED chip whose color temperature is adjusted in the daylight LED light according to the first embodiment of the present inventive concept.

FIG. 2 is a schematic view showing a configuration of an LED chip whose color temperature is adjusted in the daylight LED light according to the first embodiment of the present inventive concept.

As shown in FIG. 2, the first LED light source 110 whose color temperature is adjusted according to the first embodiment of the present inventive concept includes the purple light-emitting LED chip 112, an RGB phosphor-coated layer 114, and a transparent resin 116.

The purple light-emitting LED chip 112 is selected from those manufactured in various methods and well known in the art. For example, the purple light-emitting LED chip 112 is manufactured to have InGaN and active layer in such a way as to emit purple light having the peak wavelength of 400 to 408 nm. However, the purple light-emitting LED chip 112 adopted in the first embodiment of the present inventive concept may not be limited thereto.

The RGB phosphor-coated layer 114 is formed by mixing the red (R) phosphor, the green (G) phosphor, and the blue (B) phosphor with an epoxy. The RGB phosphor-coated layer 114 is applied onto the purple light-emitting LED chip 112 and then dried.

The transparent resin 116 covers the RGB phosphor-coated layer 114.

Further, the red (R) phosphor, the green (G) phosphor, and the blue (B) phosphor as the RGB phosphors have been diversely developed and known in the art. According to the present inventive concept, the red (R) phosphor is made of $K(WO_4)$:Eu, Sm, the green (G) phosphor is made of $(BaSr)_2SiO_4$:Eu, and the blue (B) phosphor is made of $(SrMg)_{10}(PO_4)_6Cl_2$:Eu. However, the RGB phosphors adopted in the first embodiment of the present inventive concept may not be limited thereto.

In this case, the violet light emitted from the purple light-emitting LED chip 112 as a light source passes through the RGB phosphor-coated layer 114, so that the violet light turns into the light with a different color (color temperature). In this case, the changed color temperature of the purple light passing through the RGB phosphor-coated layer 114 is controllable. The color temperature is controlled by adjusting a mass ratio of the RGB phosphors to the mass of a sample made by mixing the epoxy and the RGB phosphors.

In this case, if the mass ratio of the RGB phosphors is low (e.g., less than or equal to 38%), the purple light passing through the RGB phosphor-coated layer 114 is changed into white color in color temperature, and contrarily, if the mass ratio of the RGB phosphors is high, the purple light passing through the RGB phosphor-coated layer 114 is changed into a yellow green color in color temperature because the light does not pass through the RGB phosphor-coated layer 114 well.

According to the first embodiment of the present inventive concept, the first LED light source 110 is configured to allow the mass ratio of the RGB phosphors of the RGB phosphor-coated layer 114 to be low so that the purple light passing through the RGB phosphor-coated layer 114 has the color temperature of 5000 to 6500 K, desirably 6500K, and the second LED light source 120 is configured to allow the mass ratio of the RGB phosphors of the RGB phosphor-coated layer 114 to be high so that the purple light passing through the RGB phosphor-coated layer 114 has the color temperature of 2500 to 3000 K, desirably 2700K.

Figure 3:
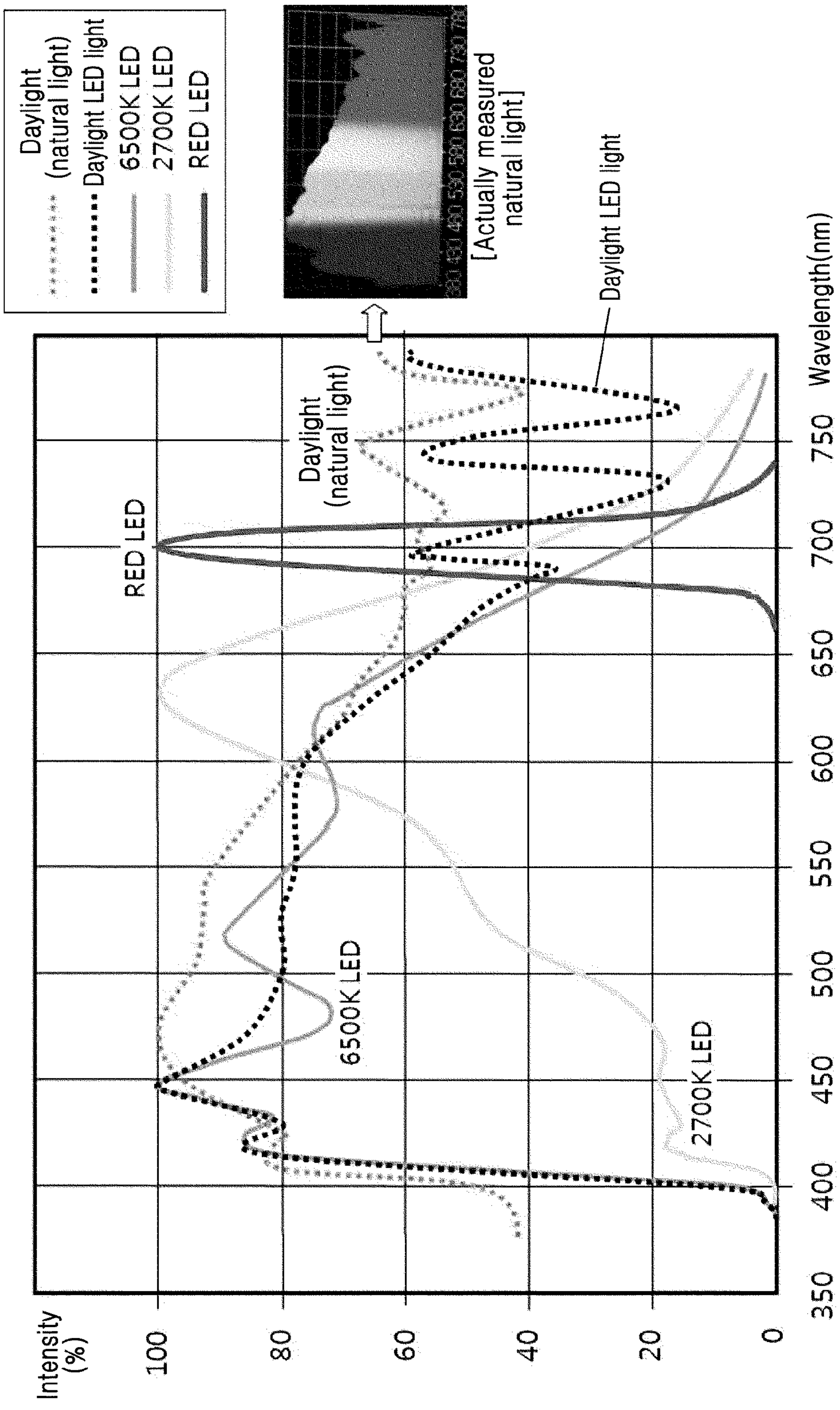
FIG. 3 is a graph showing a relation between the wavelengths of the daylight LED light according to the first embodiment of the present inventive concept and the wavelengths of natural light.

FIG. 3 is a graph showing a relation between the wavelengths of the daylight LED light according to the first embodiment of the present inventive concept and the wavelengths of natural light.

FIG. 3 shows relative intensities of color temperatures according to wavelengths. Daylight (natural light) has the greatest relative intensity between 450 and 500 nm in the range of visible light wavelengths (380 to 780 nm), becomes slowly decreased in the relative intensity toward the rear side wavelengths, and has repeated peak characteristics in the wavelengths of 660 to 780 nm (670 nm, 700 nm, 750 nm, and 780 nm).

The first LED light source 110 of the daylight LED light 10 according to the first embodiment of the present inventive concept, which is configured to apply the RGB phosphors onto the purple light-emitting LED chip 112 for emitting the purple light with the peak wavelength of 400 to 408 nm to be thus adjusted to have the color temperature of 6500 K, has the greatest relative intensity around the wavelength of 450 nm, becomes decreased in the relative intensity toward the rear side wavelengths of the visible light wavelengths (380 to 780 nm), and is then drastically dropped around the wavelength of 650 nm. Further, the second LED light source 120 of the daylight LED light 10 according to the first embodiment of the present inventive concept, which is configured to apply the RGB phosphors onto the purple light-emitting LED chip 112 for emitting the purple light with the peak wavelength of 400 to 408 nm to be thus adjusted to have the color temperature of 2700 K, becomes increased in the relative intensity as the wavelength is great, has the greatest relative intensity around the wavelengths of 600 to 650 nm, and becomes then decreased in the relative intensity thereof.

The third LED light source 130, which is configured to emit the red light with the peak wavelength of 660 to 780 nm, has the peak wavelength in the range of the wavelengths of 660 to 780 nm.

It can be appreciated from FIG. 3 that the daylight LED light 10 according to the first embodiment of the present inventive concept has the spectrum very similar to daylight as natural light.

The relative intensity of the wavelength of 700 nm of daylight corresponds to 60% of the peak wavelength of 470 nm thereof, and if the red light emitting LED (54 mW) having the peak wavelength of 700 nm is added to daylight (120 mW), the peak wavelength thereof rises by 91% so that 116% of the peak wavelength is obtained at the wavelength of 700 nm. If it is desired that the red light emitting LED obtains 60% of the peak wavelength of 470 nm of daylight at the wavelength of 700 nm, like the daylight, the daylight has to have 2.6×120 mW=312 mW. Accordingly, the power ratio of the daylight to the 700 nm red light emitting LED (IR) is 312:54, that is, 5.8:1, the power ratio of the daylight to the 700 and 750 nm red light emitting LED (IR) is 2.9:1, and the power ratio of the daylight to the 700, 750, and 780 nm red light emitting LED (IR) is 1.9:1. Therefore, the power ratio of the daylight to the red light emitting LED (IR) is in the range of 1.5:1 to 6:1.

Figure 4:
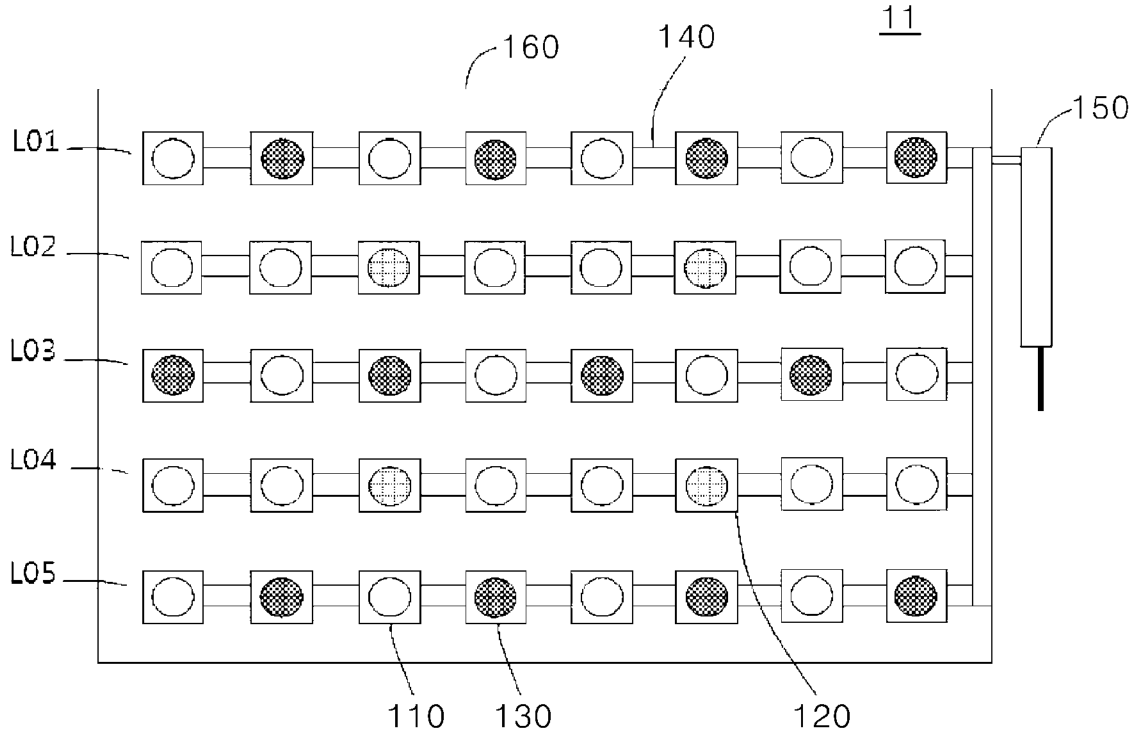
FIG. 4 is a schematic view showing a surface light source type daylight LED light as a first variation of the daylight LED light according to the first embodiment of the present inventive concept.

FIG. 4 is a schematic view showing a surface light source type daylight LED light as a first variation of the daylight LED light according to the first embodiment of the present inventive concept.

As shown in FIG. 4, a surface light source type daylight LED light 11 as a first variation of the daylight LED light 10 according to the first embodiment of the present inventive concept includes first LED light sources 110, second LED light sources 120, third LED light sources 130, PCB substrates 140, a converter 150, and a case 160.

The first LED light sources 110, the second LED light sources 120, and the third LED light sources 130 have the same characteristics as in the embodiment as shown in FIGS. 1 to 3, but they are arranged in rows and columns with given intervals on the PCB substrates 140. In this case, the first LED light sources 110, the second LED light sources 120, and the third LED light sources 130 are electrically connected to the PCB substrates 140.

The PCB substrates 140 each have the shape of a rectangular plate. For example, five PCB substrates L01 to L05 are arranged at given intervals in a transverse direction of the case 160.

The converter 150 converts the alternating current received into direct current for driving the LED light sources. In specific, the converter 150 converts the alternating current received into the direct current and thus supplies the direct current to the five PCB substrates 140.

The case 160 serves as a housing of the daylight LED light 11 and is a thin sheet with given width and length on which the plurality of LED light sources are mounted.

In FIG. 4, four first LED light sources 110 are located on the first PCB substrate L01, six first LED light sources 110 on the second PCB substrate L02, four first LED light sources 110 on the third PCB substrate L03, six first LED light sources 110 on the fourth PCB substrate L04, and four first LED light sources 110 on the fifth PCB substrate L05, so that the total number of first LED light sources 110 is 24. Further, two second LED light sources 120 are located on the second PCB substrate L02, and two second LED light sources 120 on the fourth PCB substrate L04, so that the total number of second LED light sources 120 is 4. Furthermore, four third LED light sources 130 are located on the first PCB substrate L01, four third LED light sources 130 on the third PCB substrate L03, and four third LED light sources 130 on the fifth PCB substrate L05, so that the total number of third LED light sources 130 is 12.

As shown in FIG. 4, for example, if the output of each LED light source is 1 W, the surface light source type daylight LED light 11 has the output of 40 W because the total number of LED light sources is 40. In this case, the number of first LED light sources 110 having the color temperature of 6500 K is 23 (60%), the number of second LED light sources 120 having the color temperature of 2700 K is 4 (10%), and the number of third LED light sources 130 having the peak wavelength of 660 to 780 nm is 12 (30%), so that they are evenly arranged. As a result, while the brightness of the light is maintained through the first LED light sources 110, the white light of the first LED light sources 110 is reduced through the yellow light of the second LED light sources 120 and reinforced with the peak wavelength of the red light of the third LED light sources 130, thereby providing the surface light source type daylight LED light 11 having the spectrum similar to the spectrum of daylight as natural light.

The surface light source type daylight LED light 11 as shown in FIG. 4 may be applied to a daylight LED fluorescent type light through the adjustment in the number of PCB substrates 140.

Figure 5:
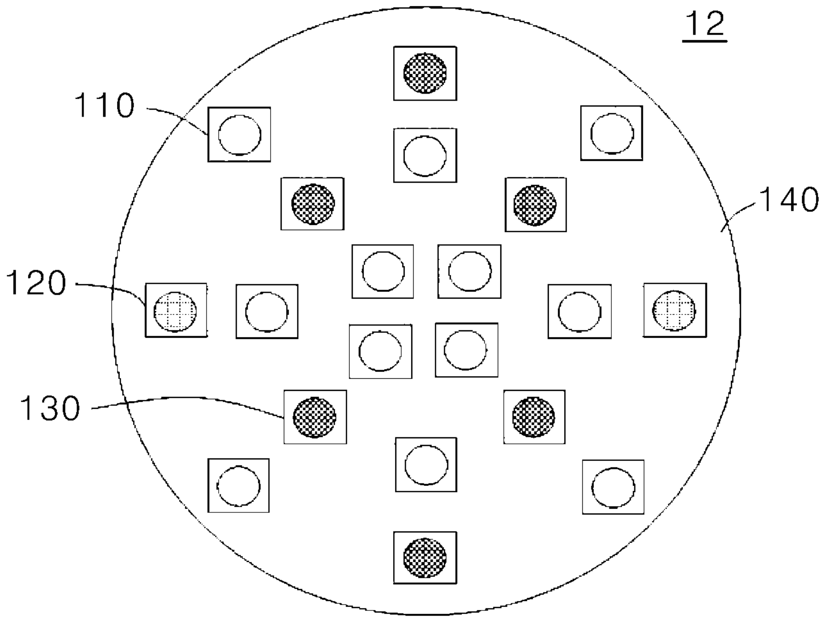
FIG. 5 is a schematic view showing a bulb type daylight LED light as a second variation of the daylight LED light according to the first embodiment of the present inventive concept.

FIG. 5 is a schematic view showing a bulb type daylight LED light as a second variation of the daylight LED light according to the first embodiment of the present inventive concept.

As shown in FIG. 5, a bulb type daylight LED light 12 as a second variation of the daylight LED light 10 according to the first embodiment of the present inventive concept includes first LED light sources 110, second LED light sources 120, third LED light sources 130, and a PCB substrate 140.

The first LED light sources 110, the second LED light sources 120, and the third LED light sources 130 have the same characteristics as in the embodiment as shown in FIGS. 1 to 3, but they are arranged radially on the PCB substrate 140. In this case, the first LED light sources 110, the second LED light sources 120, and the third LED light sources 130 are electrically connected to the PCB substrate 140.

The PCB substrate 140 has the shape of a circular plate.

In FIG. 5, 12 first LED light sources 110, two second LED light sources 120, and six third LED light sources 130 are located on the PCB substrate 140.

As shown in FIG. 5, for example, if the output of each LED light source is 1 W, the bulb type daylight LED light 12 has the output of 20 W because the total number of LED light sources is 20. In this case, the number of first LED light sources 110 having the color temperature of 6500 K is 12 (60%), the number of second LED light sources 120 having the color temperature of 2700 K is 2 (10%), and the number of third LED light sources 130 having the peak wavelength of 660 to 780 nm is 6 (30%), so that they are evenly arranged. As a result, while the brightness of the light is maintained through the first LED light sources 110, the white light of the first LED light sources 110 is reduced through the yellow light of the second LED light sources 120 and reinforced with the peak wavelength of the red light of the third LED light sources 130, thereby providing the bulb type daylight LED light 12 having the spectrum similar to the spectrum of daylight as natural light.

Figure 6:
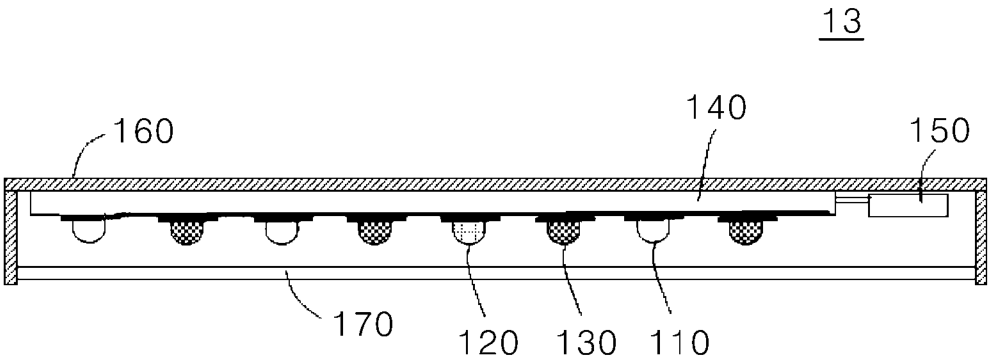
FIG. 6 is a schematic view showing a surface light source type daylight LED light apparatus using the daylight LED light according to the first embodiment of the present inventive concept.

FIG. 6 is a schematic view showing a surface light source type daylight LED light apparatus using the daylight LED light according to the first embodiment of the present inventive concept.

As shown in FIG. 6, a surface light source type daylight LED light apparatus 13 using the daylight LED light according to the first embodiment of the present inventive concept includes first LED light sources 110, second LED light sources 120, third LED light sources 130, a PCB substrate 140, a converter 150, a case 160, and a diffusion cover 170.

The first LED light sources 110, the second LED light sources 120, and the third LED light sources 130 have the same characteristics as in the embodiment as shown in FIGS. 1 to 3, but they are mounted on the PCB substrate 140 to provide the daylight LED light sources as the surface light sources. In this case, the PCB substrate 140 has the shape of a rectangular plate and is located on bottom of the case 160. Further, the PCB substrate 140 is a thin type substrate with given width and length on which the plurality of LED light sources are mounted.

The converter 150 converts the alternating current received into direct current for driving the LED light sources. In specific, the converter 150 converts the alternating current received into the direct current and thus supplies the direct current to the PCB substrate 140.

The case 160 serves as a housing of the surface light source type daylight LED light apparatus 13 and has a bottom with given width and length and wall bodies each having a given width along the edges of the bottom.

The diffusion cover 170 is transparent or semi-transparent and disposed on one side of the case 160 to face the daylight LED light sources. The diffusion cover 170 is disposed to face the bottom of the case 160 in such a way as to be coupled to the end portions of the wall bodies of the case 160.

The surface light source type daylight LED light apparatus 13 using the daylight LED light according to the first embodiment of the present inventive concept may be of course carried out in various methods, without being limited thereto. According to the present inventive concept, the case 160 has the shape of a rectangle with given width and length, but without being limited thereto, the case 160 may be a housing having a bottom with a given size and a wall body having a given height along the periphery of the bottom. Accordingly, the PCB substrate 140 may be of course deformed in accordance with the shape of the housing.

Further, in FIG. 6, the surface light source type daylight LED light apparatus 13 may be applied to a daylight LED fluorescent type light apparatus through the adjustment in the number of PCB substrates 140 and the number of first to third LED light sources.

Figure 7:
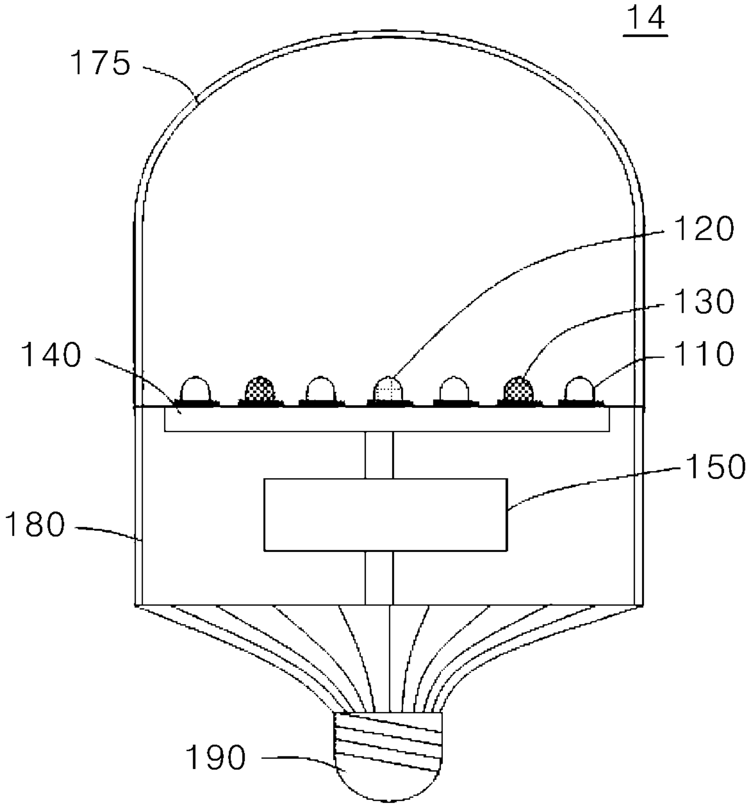
FIG. 7 is a schematic view showing a bulb type daylight LED light apparatus using the daylight LED light according to the first embodiment of the present inventive concept.

FIG. 7 is a schematic view showing a bulb type daylight LED light apparatus using the daylight LED light according to the first embodiment of the present inventive concept.

As shown in FIG. 7, a bulb type daylight LED light apparatus 14 using the daylight LED light according to the first embodiment of the present inventive concept includes first LED light sources 110, second LED light sources 120, third LED light sources 130, a PCB substrate 140, a converter 150, a bulb diffusion cover 175, a bulb body 180, and a socket 190.

The first LED light sources 110, the second LED light sources 120, and the third LED light sources 130 have the same characteristics as in the embodiment as shown in FIGS. 1 to 3, but they are mounted on the PCB substrate 140 to provide the bulb type light sources.

In this case, the PCB substrate 140 has the shape of a circular plate and is located inside the bulb body 180. Further, the PCB substrate 140 has a given size to mount the plurality of LED light sources on top thereof.

The converter 150 is located under the PCB substrate 140 in such a way as to be electrically connected to the PCB substrate 140 and converts alternating current into direct current to supply the direct current to the PCB substrate 140.

The bulb diffusion cover 175 is coupled to top of the bulb body 180 to face the PCB substrate 140. The bulb diffusion cover 175 is transparent or semi-transparent and emits the light emitted from the LED light sources to the outside.

The bulb diffusion cover 175 and the socket 190 serve as a housing of the bulb type daylight LED light apparatus 14 and have the entire shape of a bulb. In this case, the bulb body 180 is cylindrical and emits the heat generated during the light emission of the LED light sources to the outside. The socket 190 is located on the underside of the bulb body 180 to supply power to the converter 150.

The surface light source type daylight LED light apparatus 13 and the bulb type daylight LED light apparatus 14 are installed in indoor place, semi-basement, or basement where no daylight exists, thereby providing the atmosphere and functions of daylight.

Figure 8:
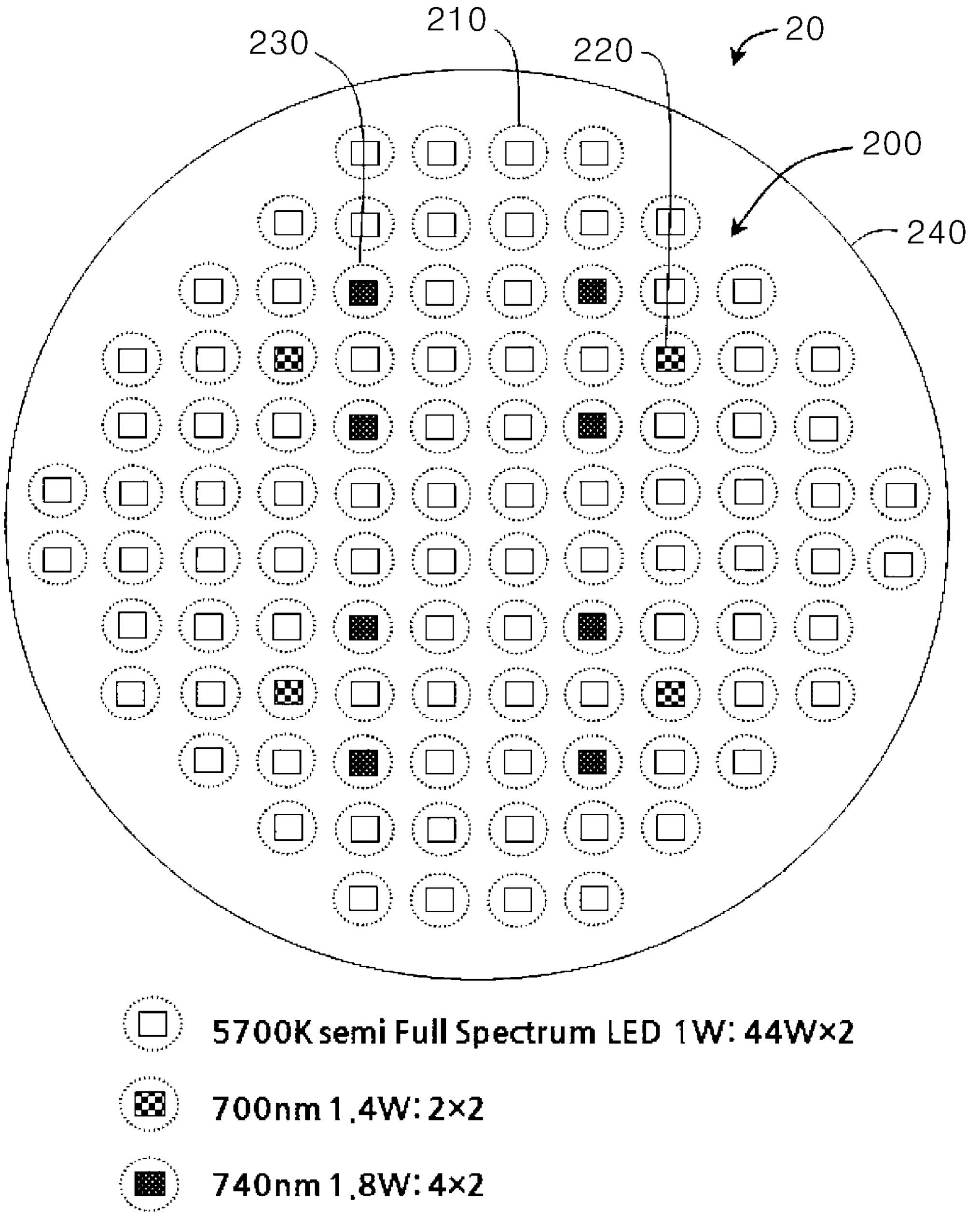
FIG. 8 is a schematic view showing a daylight LED floodlight according to a second embodiment of the present inventive concept.

FIG. 8 is a schematic view showing a daylight LED floodlight according to a second embodiment of the present inventive concept.

As shown in FIG. 8, a daylight LED floodlight 20 according to a second embodiment of the present inventive concept includes first LED light sources 210, second LED light sources 220, third LED light sources 230, and a stand 240.

The first LED light sources 210 each have a color temperature (Kelvin scale) of 5500 to 5700 K when emitting light. The first LED light sources 210 are configured to apply RGB phosphors onto purple light-emitting LED chips to thus have the color temperature of 5500 to 5700 K. In specific, the first LED light sources 210 are configured to apply a red (R) phosphor, a green (G) phosphor, and a blue (B) phosphor to purple light-emitting LED chips so that when the purple light-emitting LED chips emit light, they each have the color temperature of 5700 to 5700 K, desirably the color temperature of 5700 K to thus emit light having a white tone to which a light blue color is added to represent a state of the sky on a sunny day.

For example, each first LED light source 210 is provided as the LED light source having the color temperature of 5500 to 5700 K by mixing a single LED having the color temperature of 6500 K and a single LED having the color temperature of 5000 K. Moreover, the first LED light sources 210 are adjusted to have the color temperature of 5500 to 5700 K, desirably 5700 K in the same method as described with reference to FIG. 2.

The second LED light sources 220 are at least one or more red light-emitting LEDs each having the peak wavelength of 630 to 720 nm. The second LED light sources 220 are configured to emit red light having the peak wavelength of 630 to 720 nm.

The third LED light sources 230 are at least one or more red light-emitting LEDs each having the peak wavelength of 730 to 780 nm. The third LED light sources 230 are configured to emit near infrared light having the peak wavelength of 730 to 780 nm.

The stand 240 serves to support the LED light sources 200 including the first LED light sources 210, the second LED light sources 220, and the third LED light sources 230.

In this case, the number of first LED light sources 210 is greater than the number of LED light sources made by adding the number of second LED light sources 220 and the number of third LED light sources 230. In this case, the number of third LED light sources 230 is greater than the number of second LED light sources 220.

For example, if the total LED light sources have the same power, the output percentage of the first LED light sources 210 with respect to the total LED light sources is in the range of 65 to 92%, the output percentage of the second LED light sources 220 with respect to the total LED light sources is in the range of 3 to 15%, and the output percentage of the third LED light sources 230 with respect to the total LED light sources is in the range of 5 to 20%. That is, if the total LED light sources have the same power, the number of first LED light sources 210 to the third LED light sources 230 corresponds to their output percentage with respect to the total LED light sources.

For another example, the installation area percentage of the first LED light sources 210 with respect to the installation area of the total LED light sources is in the range of 80 to 90%, the installation area percentage of the second LED light sources 220 with respect to the installation area of the total LED light sources is in the range of 4 to 8%, and the installation area percentage of the third LED light sources 230 with respect to the installation area of the total LED light sources is in the range of 6 to 12%.

For example, as shown in FIG. 1, the daylight LED floodlight 20 according to the second embodiment of the present inventive concept is configured to have 88 (88 W, about 81.2%) first LED light sources 210 each having an output of 1 W that are selected in the color temperature of 5500 to 5700 K having a semi-full spectrum, four (about 5.6 W, about 5.2%) second LED light sources 220 each having an output of 1.4 W that are selected in the range of the peak wavelength of 630 to 700 nm, and eight (about 14.8 W, about 13.6%) third LED light sources 230 each having an output of 1.8 W that are selected in the range of the peak wavelength of 730 to 780 nm. This shows an example in which the daylight LED floodlight 20 may be applied to the daylight LED floodlight having the output of about 100 W.

If the respective LED light sources have different power, the number of LED light sources is adjustable by the sum of power of the respective LED light sources.

Figure 9:
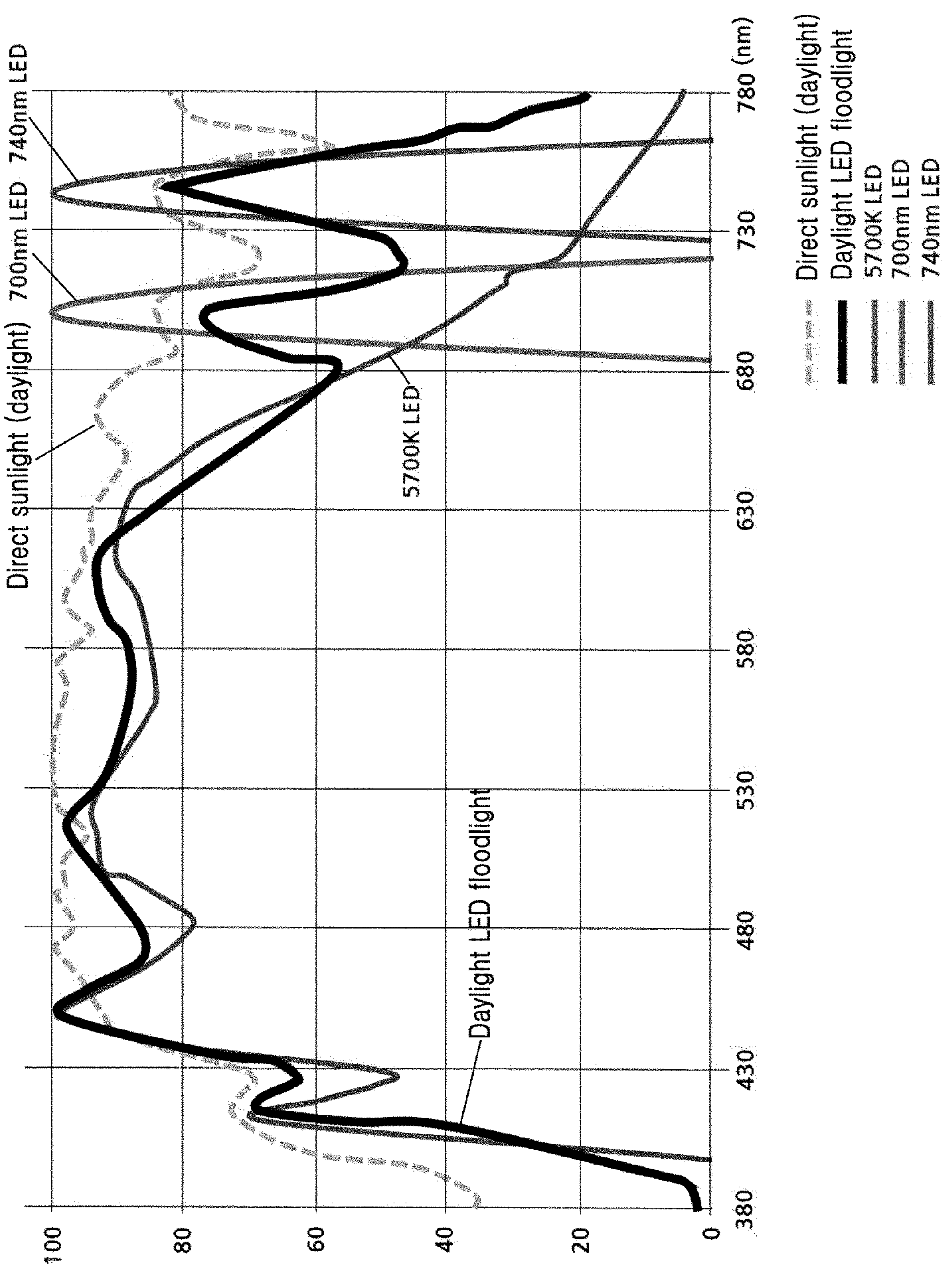
FIG. 9 is a graph showing a relation between the wavelengths of the daylight LED floodlight according to the second embodiment of the present inventive concept and the wavelengths of daylight.

FIG. 9 is a graph showing a relation between the wavelengths of the daylight LED floodlight according to the second embodiment of the present inventive concept and the wavelengths of daylight.

As shown in FIG. 9, daylight (natural light) has the greatest relative intensity between 450 and 500 nm in the range of visible light wavelengths (380 to 780 nm), becomes slowly decreased in the relative intensity toward the rear side wavelengths, and has repeated peak characteristics in the wavelengths of 660 to 780 nm (670 nm, 700 nm, 750 nm, and 780 nm).

The first LED light source 210 of the daylight LED floodlight 20 according to the second embodiment of the present inventive concept, which is configured to apply the RGB phosphors onto the purple light-emitting LED chip 112 for emitting the purple light with the peak wavelength of 400 to 408 nm to be thus adjusted to have the color temperature of 5700 K, has the greatest relative intensity around the wavelength of 450 nm, becomes decreased in the relative intensity toward the rear side wavelengths of the visible light wavelengths (380 to 780 nm), and is then drastically dropped around the wavelength of 630 nm.

Further, the second LED light source 220 of the daylight LED floodlight 20 according to the second embodiment of the present inventive concept, which is configured to apply the RGB phosphors onto the purple light-emitting LED chip 112 for emitting the purple light with the peak wavelengths of 400 to 408 nm to be thus adjusted to have the color temperature of 2700 K, has the peak wavelength in the range of the wavelength of 630 to 720 nm. Further, the third LED light source 230 of the daylight LED floodlight 20 according to the second embodiment of the present inventive concept, which is configured as the red light-emitting LED light source with the peak wavelength of 740 nm, has the peak wavelength in the range of the wavelength of 730 to 780 nm.

It can be appreciated from FIG. 9 that the daylight LED floodlight 20 according to the second embodiment of the present inventive concept has the spectrum very similar to daylight as natural light and achieves a CRI of 99 closest to the CRI of 99.5 of daylight.

In this case, the relative intensity of the wavelength of 700 nm of the daylight corresponds to 60% of the peak wavelength of 470 nm thereof, and if the red light emitting LED (54 mW) having the peak wavelength of 700 nm is added to the daylight (120 mW), the peak wavelength thereof rises by 91% so that 116% of the peak wavelength is obtained at the wavelength of 700 nm. If it is desired that the red light emitting LED obtains 60% of the peak wavelength of 470 nm of the daylight at the wavelength of 700 nm, like the daylight, the daylight has to have 2.6×120 mW=312 mW. Accordingly, the power ratio of the daylight to the second LED light source 220 as the 700 nm red light emitting LED (IR) is 312:54, that is, 5.8:1, the power ratio of the daylight to the 700 and 750 nm red light emitting LED (IR) is 2.9:1, and the power ratio of the daylight to the 700, 750, and 780 nm red light emitting LED (IR) is 1.9:1. Therefore, the power ratio of the daylight to the red light emitting LED (IR) is in the range of 1.5:1 to 6:1.

Figure 10:
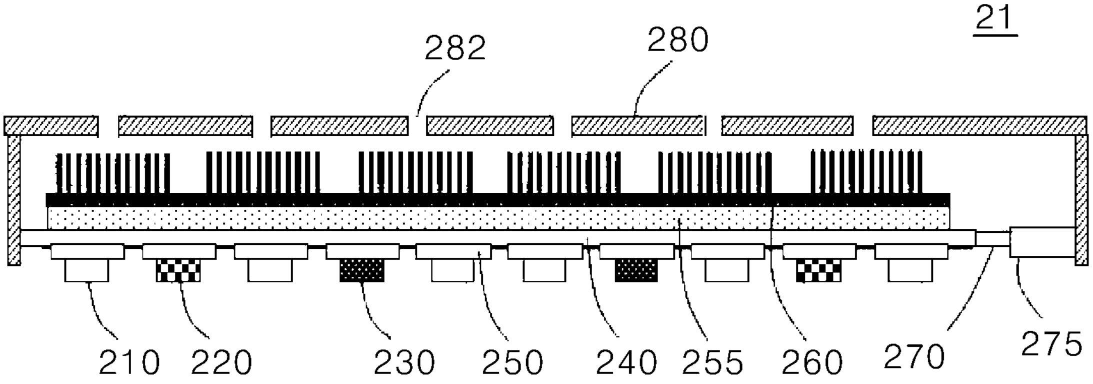
FIG. 10 is a schematic view showing a daylight LED floodlight apparatus using the daylight LED floodlight according to the second embodiment of the present inventive concept.

FIG. 10 is a schematic view showing a daylight LED floodlight apparatus using the daylight LED floodlight according to the second embodiment of the present inventive concept.

As shown in FIG. 10, a daylight LED floodlight apparatus 21 using the daylight LED floodlight according to the second embodiment of the present inventive concept includes first LED light sources 210, second LED light sources 220, third LED light sources 230, a stand 240, PCB substrates 250, a heat transfer member 255, a heat radiation member 260, a connector 270, a converter 275, and a housing 280.

The first LED light sources 210, the second LED light sources 220, and the third LED light sources 230 have the same characteristics as in the embodiment as shown in FIG. 8, but they are mounted on the PCB substrates 250 to be provided as the plurality of light sources of the daylight LED floodlight. In this case, the PCB substrates 250 are connected to the converter 275 by means of the connector 270 and each have given width and length so that parts such as a resistor and a drive IC are mounted on the PCB substrates 250 to drive the LED light sources.

The stand 240 serves to support the PCT substrates 250 on which the first LED light sources 210, the second LED light sources 220, and the third LED light sources 230 are mounted against one surface thereof. The stand 140 has a given size so that it can locate the daylight LED floodlight thereon.

The heat transfer member 255 is located on the other surface of the stand 240. The heat transfer member 255 transfers the heat generated from the first LED light sources 210, the second LED light sources 220, and the third LED light sources 230 to the outside.

The heat radiation member 260 comes into close contact with the heat transfer member 255. The heat radiation member 260 has a plurality of fins adapted to radiate the heat received from the heat transfer member 255 to the outside.

The connector 270 electrically connects the converter 275 to the PCB substrates 250.

The converter 275 converts the alternating current received into direct current for driving the daylight LED light sources. In specific, the converter 275 converts the alternating current into the direct current and thus supplies the direct current to the PCB substrates 250.

The housing 280 accommodates the daylight LED light sources and the converter 275, while exposing the front surfaces of the daylight LED light sources to the outside. The housing 280 has a plurality of holes 282 through which the radiation heat of the heat radiation member 260 is exhausted to the outside. In this case, the holes 282 are formed on top of the housing 280 to face the heat radiation member 260.

The present inventive concept may be modified in various ways and may have several exemplary embodiments. Specific exemplary embodiments of the present inventive concept are illustrated in the drawings and described in detail in the detailed description. However, this does not limit the invention within specific embodiments and it should be understood that the invention covers all the modifications, equivalents, and replacements within the idea and technical scope of the invention.

The invention claimed is:

1. A daylight LED light comprising:

a plurality of first LED light sources having a color temperature of 5000 to 6500 K when emitting light, by applying RGB phosphors onto purple light-emitting LED chips;

a plurality of second LED light sources having a color temperature of 2500 to 3000 K when emitting light, by applying RGB phosphors onto purple light-emitting LED chips; and a plurality of third LED light sources having red light-emitting LED chips, wherein the number of first LED light sources is greater than the number of third LED light sources, and the number of third LED light sources is greater than the number of second LED light sources.

2. The daylight LED light according to claim 1, further comprising rectangular plate-shaped PCB substrates for arranging the first LED light sources, the second LED light sources, and the third LED light sources in rows and columns with given intervals thereon to provide light sources for a surface light source or fluorescent type light.

3. The daylight LED light according to claim 1, further comprising a circular plate-shaped PCB substrate for radially arranging the first LED light sources, the second LED light sources, and the third LED light sources thereon to provide light sources for a bulb.

4. The daylight LED light according to claim 1, wherein the color temperature of each first LED light source is 6500 K, the color temperature of each second LED light source is 2700 K, and the wavelength of each third LED light source is in the range of 660 to 780 nm.

5. The daylight LED light according to claim 1, wherein if the total LED light sources have the same power, the percentage of the first LED light sources with respect to the total LED light sources is in the range of 50 to 90%, the percentage of the second LED light sources with respect to the total LED light sources is in the range of 0 to 10%, and the percentage of the third LED light sources with respect to the total LED light sources is in the range of 10 to 40%.

6. The daylight LED light according to claim 5, wherein the ratio of the first LED light sources to the second LED light sources to the third LED light sources is 6:1:3.

7. A daylight LED light apparatus comprising:

the daylight LED light having the PCB substrates adapted to mount the first LED light sources, the second LED light sources, and the third LED light sources thereon according to claim 1;

a converter for converting alternating current received into direct current for driving the LED light sources of the daylight LED light;

a housing for accommodating the LED light sources and the converter therein; and a transparent or semi-transparent diffusion cover disposed on one side of the housing to face the LED light sources.

8. The daylight LED light apparatus according to claim 7, wherein the housing is a case having a bottom and wall bodies formed along the edges of the bottom, the diffusion cover is disposed to face the bottom in such a way as to be coupled to the end portions of the wall bodies, and the PCB substrates have the shapes of rectangular plates and are located on the bottom, so that if the number of PCB substrate is one, the LED light sources become fluorescent type light sources, and if a plurality of PCB substrates are arranged at given intervals, the LED light sources become surface light sources.

9. The daylight LED light apparatus according to claim 7, wherein the housing comprises a cylindrical bulb body for emitting the heat generated to the outside and a socket located on the underside of the bulb body to supply power to the inside of the bulb, the diffusion cover is disposed to face the PCB substrate in such a way as to be coupled to top of the bulb body, and the PCB substrate has the shape of a circular plate and is located at the inside of the bulb body, so that the LED light sources become bulb type light sources.

10. A daylight LED floodlight apparatus comprising:

a plurality of first LED light sources having a color temperature of 5500 to 5700 K when emitting light, by applying RGB phosphors onto purple light-emitting LED chips;

at least one or more second LED light sources as red light-emitting LEDs having a peak wavelength of 630 to 720 nm; and at least one or more third LED light sources as red light-emitting LEDs having a peak wavelength of 730 to 780 nm, wherein the number of first LED light sources is greater than the number of LED light sources made by adding the number of second LED light sources and the number of third LED light sources.

11. The daylight LED floodlight apparatus according to claim 10, wherein the number of third LED light sources is greater than the number of second LED light sources.

12. The daylight LED floodlight apparatus according to claim 11, wherein if the total LED light sources have the same power, the output percentage of the first LED light sources with respect to the total LED light sources is in the range of 65 to 92%, the output percentage of the second LED light sources with respect to the total LED light sources is in the range of 3 to 15%, and the output percentage of the third LED light sources with respect to the total LED light sources is in the range of 5 to 20%.

13. The daylight LED floodlight apparatus according to claim 11, wherein the installation area percentage of the first LED light sources with respect to the installation area of the total LED light sources is in the range of 80 to 90%, the installation area percentage of the second LED light sources with respect to the installation area of the total LED light sources is in the range of 4 to 8%, and the installation area percentage of the third LED light sources with respect to the installation area of the total LED light sources is in the range of 6 to 12%.

14. The daylight LED floodlight apparatus according to claim 10, further comprising:

a stand for supporting PCT substrates on which the first LED light sources, the second LED light sources, and the third LED light sources are mounted against one surface thereof;

a heat transfer member located on the other surface of the stand to transfer the heat generated from the first LED light sources, the second LED light sources, and the third LED light sources to the outside;

a heat radiation member coming into close contact with the heat transfer member to radiate the heat received from the heat transfer member to the outside;

a converter for converting alternating current received into direct current for driving the first LED light sources, the second LED light sources, and the third LED light sources; and a housing for accommodating the stand and the converter, while exposing the front surfaces of the first LED light sources, the second LED light sources, and the third LED light sources to the outside, and having a plurality of holes through which the radiation heat of the heat radiation member is exhausted to the outside, the holes being formed to face the heat radiation member.

* * * * *